(12) United States Patent
Schuele et al.

(10) Patent No.: US 12,044,315 B2
(45) Date of Patent: Jul. 23, 2024

(54) SEALING DEVICE AND SEALING ARRANGEMENT WITH SENSOR SYSTEM FOR CONDITION MONITORING

(71) Applicant: Trelleborg Sealing Solutions Germany GmbH, Stuttgart (DE)

(72) Inventors: Christoph Schuele, Boeblingen (DE); Martin Franz, Wannweil (DE); Johan Strandberg, Stuttgart (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 18/172,101

(22) Filed: Feb. 21, 2023

(65) Prior Publication Data

US 2023/0193999 A1    Jun. 22, 2023

Related U.S. Application Data

(63) Continuation of application No. PCT/EP2021/074977, filed on Sep. 10, 2021.

(30) Foreign Application Priority Data

Sep. 10, 2020  (DE) ................ 10 2020 211 404.8

(51) Int. Cl.
 *F16J 15/3296* (2016.01)
 *F16J 15/3208* (2016.01)
 (Continued)

(52) U.S. Cl.
 CPC ....... *F16J 15/3296* (2013.01); *F16J 15/3208* (2013.01); *F16J 15/3212* (2013.01); *F16J 15/3236* (2013.01); *F16J 15/3492* (2013.01)

(58) Field of Classification Search
 CPC .. F16J 15/3296; F16J 15/3208; F16J 15/3212; F16J 15/3236; F16J 15/3492; F16J 15/3268
 See application file for complete search history.

(56) References Cited

U.S. PATENT DOCUMENTS 6,003,872 A  12/1999 Nord
10,371,179 B2  8/2019 Stanford
(Continued)

FOREIGN PATENT DOCUMENTS

| CN | 106523710 A | 3/2017 |
|---|---|---|
| DE | 10 2016 214 942 A1 | 2/2017 |
| EP | 0 737 306 B1 | 4/1998 |

*Primary Examiner* — Eugene G Byrd
*Assistant Examiner* — L. Susmitha Koneru
(74) *Attorney, Agent, or Firm* — Orbit IP

(57) ABSTRACT

A sealing device has a sensor system for condition monitoring. The sealing device includes a sealing ring with a dynamic sealing section for dynamically sealing abutment at a sealing surface of a machine part and a pretensioning ring for pretensioning the sealing section against the sealing surface having a first section and a second section. The second section can be deflected in a spring-elastic manner in an axial or radial direction relative to the central axis of the sealing device from a first position relative to the first section. The sensor system includes at least one measuring element arranged in the intermediate space on the pretensioning ring, which responds indirectly or directly to a deflection movement of the first section of the pretensioning ring. A sealing arrangement may have such a sealing device.

13 Claims, 4 Drawing Sheets

(51) Int. Cl.
*F16J 15/3212* (2016.01)
*F16J 15/3236* (2016.01)
*F16J 15/34* (2006.01)

(56) References Cited

U.S. PATENT DOCUMENTS

| | | |
|---|---|---|
| 10,458,551 B2 | 10/2019 | Lang et al. |
| 10,648,568 B2 | 5/2020 | Nahrwold et al. |
| 2018/0274682 A1 | 9/2018 | Shimizu |

SEALING DEVICE AND SEALING ARRANGEMENT WITH SENSOR SYSTEM FOR CONDITION MONITORING

CROSS-REFERENCE TO RELATED APPLICATIONS

This continuation application claims priority to PCT/EP2021/074977 filed on Sep. 10, 2021, which has published as WO 2022/053636 A1, and also the German application number 10 2020 211 404.8 filed on Sep. 10, 2020, the entire contents of which are fully incorporated herein with these references.

DESCRIPTION

Field of the Invention

The invention relates to a sealing device with a sensor system for condition monitoring.

Background of the Invention

Dynamic seals have the task of preventing material transfers between two components moving relative to each other, from one space into another, or reducing them to a permissible level. They represent an important safety-relevant and function-relevant part in many systems. Should a failure occur, it can lead to functional limitations or even to a functional failure of the entire system or to the release of harmful substances. In order to prevent this, regular maintenance or replacement of the seals is necessary, especially in system-critical applications, well before the expected failure time of the seal.

To enable a flexible structuring of the maintenance intervals and thus to minimize system downtimes, an in situ condition monitoring of seals is desirable. For this purpose, sensors are increasingly being integrated directly into the seal in the vicinity of its dynamic sealing section in order to make it possible to draw conclusions about functionality and the age-related wear of the seal.

A sealing device with such a sensor system for monitoring the condition of the dynamic seal is known, for example, from U.S. Pat. No. 10,458,551 B2 and U.S. Pat. No. 10,371,179 B2. By integrating the sensor system into the seals, there is a risk that the actual function and service life of the seal will be negatively affected. In addition, known seals are complicated to manufacture and especially in the case of smaller sizes can only be realized to a limited extent.

It is therefore the object of the invention to provide a sealing device and a sealing arrangement with a sensor system for monitoring the condition of the seal, in which a negative influence on the sealing functionality and service life of the seal is prevented, and which is simple and inexpensive to manufacture.

SUMMARY OF THE INVENTION

The object relating to the sealing device is achieved by a sealing device having the features specified in the first independent claim. The sealing arrangement according to the invention comprises the features specified in another independent claim. Preferred developments of the invention are the subject of the subclaims and the description. Further advantages of the invention can be found in the description and the drawings.

The sealing device according to the invention with a sensor system for condition monitoring comprises a sealing ring with a sealing section for sealing contact at a sealing surface of a machine part. The dynamic sealing section is preferably designed as a dynamic sealing section for the dynamically sealing contact at the sealing surface. A pretensioning ring serves for pretensioning the sealing section against the sealing surface and has a first section and a second section, which together delimit an intermediate space. One of the two sections can be deflected in a spring-elastic manner from a first position relative to the respective other of the two sections in a direction radial or axial to the center axis of the sealing device. In the case of a radial sealing ring in the radial direction and in the case of an axial sealing ring in the axial direction. The sensor system comprises at least one measuring element which is arranged in the intermediate space of the pretensioning ring and which responds indirectly or directly to a deflection movement of one section of the pretensioning ring.

In the sealing device according to the invention, transverse or lateral forces acting on the sealing ring or movements of the sealing ring or of the pretensioning ring derived therefrom can be determined during operation by means of the sensor system. On the basis of this information, information about relative movements of two machine parts sealed against each other by the sealing device, in particular their acceleration, stroke, movement pattern, etc., can be determined during operation of the sealing device. On the basis of the above-mentioned information, conclusions can be drawn about the magnitude and the time profile of a differential pressure applied via the sealing element during operation and about the functional state of the sealing ring along with the remaining service life of the same. By arranging the measuring element of the sensor system within the intermediate space of the pretensioning ring, negative effects on the function and service life of the sealing ring can be prevented. In addition, the sealing device is simple and inexpensive to implement.

According to the invention, the sensor system preferably has several, in particular exactly three or exactly four measuring elements, which are arranged spaced apart from one another, preferably regularly, in the circumferential direction of the pretensioning ring. It goes without saying that the sensor system can also have more than four measuring elements, in particular when the pretensioning ring has a larger diameter. As a result, measurement data can be determined in a spatially manner resolved over the circumference of the pretensioning ring. This enables more accurate, more valid and more meaningful conclusions to be drawn regarding the function and remaining service life of the sealing ring.

According to a preferred development of the invention, the two sections of the pretensioning ring each comprise a permanent magnet or the two sections of the pretensioning ring together form a permanent magnet in such a way that a magnetic field is formed between the two sections of the pretensioning ring. In this type of construction, the measuring element is preferably designed in the form of a Hall sensor, by means of which changes in the magnetic field can be detected. The pretensioning ring can be formed in a cost-effective and simple manner from a material having permanent magnetic properties. In this case, the number of parts required can be kept low. The attachment of separately formed permanent magnets to the pretensioning ring can thus be completely eliminated.

According to another design according to the invention, the measuring element according to the invention can be arranged in the intermediate space in such a way that the measuring element is deformed at least sectionally in the radial direction by a deflection of the second section relative to the second section. In this case, the measuring element preferably executes, at least sectionally, an axial movement or a relative movement to the pretensioning ring directed in the circumferential direction of the pretensioning ring, which can be detected by a (separate) sensor. Here, the measuring element is thus designed as a mechanical actuator that interacts with the sensor.

According to a preferred development of the invention, the measuring element can comprise an elastomeric material which can be compressed, preferably in a volume-constant manner, and which extends from the first to the second section of the pretensioning ring. According to the invention, a contactless sensor can be assigned to the measuring element. According to one embodiment, the sensor can be a distance sensor, by means of which the distance between the sensor and the measuring element can be determined optically or by means of ultrasound. In this case, the measuring element can have a measuring mark for the sensor at a prespecified position, the measuring mark consisting of a different material than the rest of the measuring element. As a result, the measurement accuracy of the distance measurement can be improved if necessary and incorrect measurements can be counteracted.

According to an alternative development of the invention, the measuring element is designed in the form of a spring element which extends from the first to the second section and which contacts a distance sensor at one end. According to the invention, the measuring element can be arranged in a clamped manner in the press fit on one of the two sections or be fastened in another way to one of the two sections, in particular glued to it or welded to it.

According to the invention, the distance sensor can be a continuous or a discrete distance sensor. The distance sensor can in particular comprise a resistive or capacitive foil or be formed by this. The distance sensor or the foil is preferably attached, in particular glued or welded, to an inner wall of one of the two sections, which faces the respective other section.

The pretensioning ring is preferably designed as a single piece from a design as well as from a manufacturing point of view. In this design, the two sections of the pretensioning ring can extend away in an axial direction in particular from a back or flank section of the pretensioning ring. Very particularly preferably, the pretensioning ring has a U-shaped or V-shaped cross-sectional shape. As a result, on the one hand, the pretensioning ring can be produced in a simple manner using conventional manufacturing methods. In addition, the pretensioning ring can be provided with a defined spring elasticity of its two sections or legs. As a result, the response behavior of the pretensioning ring to forces acting on the pretensioning ring can be reliably set to prespecified values. Overall, a wide range of applications of the sealing device can thereby be ensured.

According to the invention, the pretensioning ring can be made of a plastic, in particular a paramagnetic plastic, of metal, in particular steel, or of a composite material.

According to the invention, the measuring elements explained above can be arranged with the respectively assigned sensors on a support element—implemented separately from the pretensioning ring. The support element, the measuring elements and the sensors thus form an easy-to-handle assembly unit. The support element can be designed, for example, in the form of an, in particular, open sleeve. The sleeve can be an extruded sleeve. In this design, the measuring elements/sensors are inserted into the sleeve. Alternatively, the support element can also be produced together with the measuring elements by means of a 3D printing method. In this type of design, the sensors are inserted into the support element or fastened to the support element. As a result, a particularly simple mounting of the measuring elements/sensors on the sealing device can be achieved. In addition, the assembly unit can be cut to length in a simple manner in the region of prespecified separating regions to a dimension required for the respective pretensioning ring. This is advantageous with regard to the production costs of the sealing device and the sealing arrangement.

The sealing arrangement according to the invention comprises a first machine part and a second machine part, which are arranged spaced apart from one another with a sealing gap being formed thereby. The two machine parts can be movable relative to one another along one and/or about an axis of movement. The sealing gap is sealed by a sealing device as explained above, the sealing ring of which, with its sealing section, in a sealing manner abuts one of the two machine parts. In the sealing arrangement according to the invention, maintenance intervals of the sealing device or of the sealing ring can be defined as required on the basis of the data obtainable by means of the sensor system, which is advantageous on the one hand for operational reliability and on the other hand for the costs associated with maintenance.

The invention is explained below on the basis of exemplary embodiments shown in the drawing. The embodiments shown and described are not to be understood as an exhaustive list, but, rather, have an exemplary character for the description of the invention.

DETAILED DESCRIPTION OF THE PREFERRED EMBODIMENTS

Figure 1:
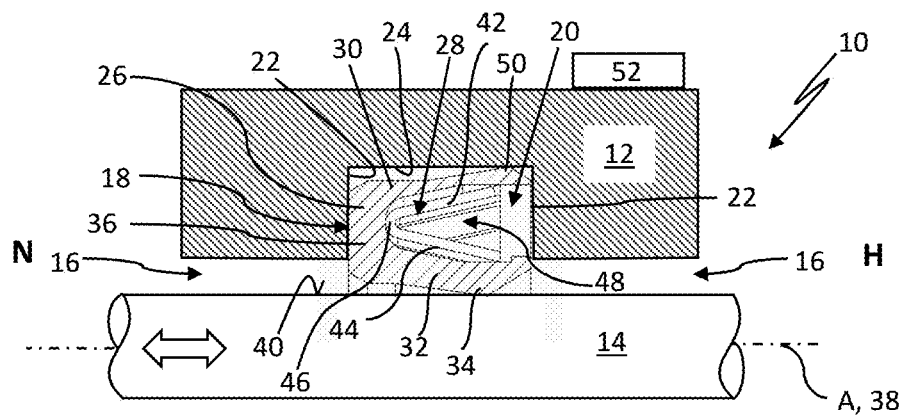
FIG. 1 shows a sealing arrangement with two machine parts, which are sealed against each other by a sealing device with a pretensioning ring and with a dynamic sealing ring, wherein the pretensioning ring is provided with a sensor system for monitoring the condition of the sealing ring.

FIG. 1 shows a sealing arrangement 10 with a first and with a second machine part 12, 14, which are arranged spaced apart from one another while forming a sealing gap 16. The two machine parts 12, 14 can be moved relative to one another here along an axis of movement denoted by A. The sealing arrangement 10 can be designed, for example, as a hydraulic cylinder, so that the first machine part 12 in this case is a cylinder tube and the second machine part 14 is a piston rod.

A sealing device 18 is used to seal a high-pressure side H of the sealing gap 16 with respect to an external or low-pressure side N. The sealing device 18 is arranged to be held in a holding groove 20 of one of the two machine parts 12, 14. The holding groove 20 has two groove flanks 22 facing each other and a groove bottom 24.

The sealing device 18 comprises a sealing ring 26 and a pretensioning ring 28. The sealing ring 26 has a base or holding section 30 and a sealing lip 32 with a sealing section 34 which is dynamic here. The holding section 30 and the sealing lip 32 are connected to one another via a connecting section 36. Overall, the sealing ring 26 has a V-shaped cross-sectional shape.

The pretensioning ring 28 serves to pretension the sealing section 36 of the sealing ring 26 in a direction radial to the center axis 38 of the sealing device 18 in a dynamical sealing manner against a sealing surface 40 of the second machine part 14. The center axis 38 of the sealing device in its mounted state coincides with the axis of movement A of the two machine parts 12, 14. The pretensioning ring 28 has an essentially V-shaped cross-sectional shape with a first section 42 and with a second section 44, which are connected to one another via a back section 46. The two sections 42, 44 can be moved from their illustrated rest position in a spring-elastic manner relative to one another in a radial direction. An intermediate space 48 is formed between the two sections 42, 44. The sealing ring 26 has a static sealing section 50. In a statically sealing manner, the static sealing section 50 here abuts the groove bottom 24 of the holding groove 20 in a radial direction.

The sealing ring 26 can be made of a material that can be deformed in a rubber-elastic or viscoelastic manner. The sealing ring 26 has a lower module than the pretensioning ring 28. The material of the sealing ring 26 can be injection-molded onto the pretensioning ring 28. The sealing device 18 is designed as a prefabricated structural unit. An evaluation unit, the function of which is explained in more detail below, is denoted by 52. The evaluation unit 52 can be arranged on one of the two machine parts 12, 14 or at a distance from them. It goes without saying that the two machine parts 12, 14 of the sealing arrangement can alternatively or additionally be rotationally adjustable relative to one another about the movement axis A. In addition, the two machine parts 12, 14 can also be arranged to rest relative to each other. In this case, the sealing section of the sealing ring 26 is designed to be statically sealing. The sealing ring 26 can also be designed as a scraper sealing ring. In this case, the high-pressure side H and the low-pressure side N of the sealing gap 16 according to FIG. 1 are arranged interchangeably.

Figure 2:
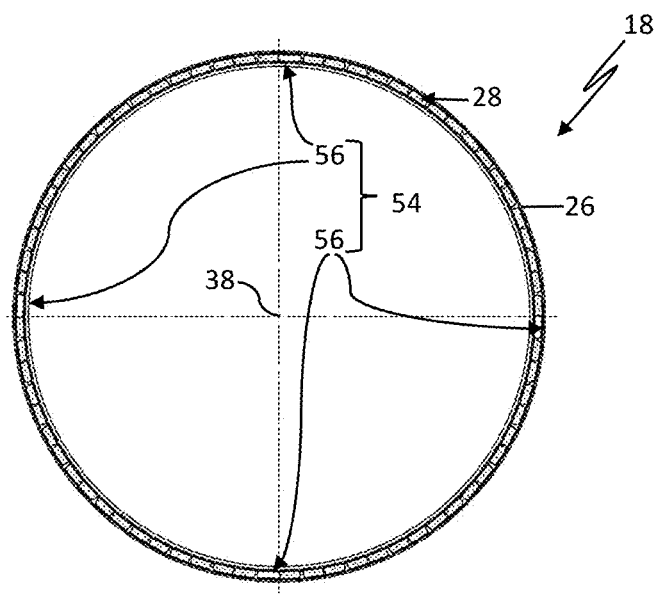
FIG. 2 shows the sealing device according to FIG. 1 in an exposed side view.

FIG. 2 shows the sealing device 18 in an exposed side view. The sealing device 18 comprises a sensor system, denoted overall by 54, which serves to monitor the condition of the sealing ring 26. Here, the sensor system 54 comprises a plurality of, preferably three or four, measuring elements 56, which are each arranged in the intermediate space 48 of the pretensioning ring 28 and which are arranged spaced apart from one another, preferably regularly, in the circumferential direction of the sealing device 18. The sensor system 54 is coupled to an evaluation unit 52 (FIG. 1).

The sensor system 54 of the sealing device 18 can have a different design. According to the embodiment of the sealing device 18 shown in FIG. 3, the measuring elements 56 are each arranged in the intermediate space 48 of the pretensioning ring 28 in such a way that the measuring element 56, by a relative movement of the two machine parts 12, 14 or a deflection of the second section 44 in the radial direction relative to the first section 42, executes a relative movement directed in the circumferential direction of the pretensioning ring 28, at least sectionally, which relative movement can be detected by a sensor 58.

The measuring element 56 is embodied here in the form of an angled leaf spring with a first leg and with a second leg 60, 62. The two legs 60, 62 are connected to one another in the corner region 64 of the measuring element 56 and are preferably of the same length. In the rest state of the sealing arrangement 10 (FIG. 1), the two legs 60, 62 together enclose an angle α between 50° and 150°, preferably between 70° and 140°.

The two free ends 66 of the measuring element 56 are assigned to or point to one of the two sections 42, 44 of the pretensioning ring 28, while the corner region 64 is assigned to or points to the respective other section 42, 44. One of the legs 60, 62 can be fastened non-displaceably at one end to one of the two sections 42, 44 of the pretensioning ring 28, in this case by way of example to the first section. The measuring element 56 is preferably made entirely of metal. A sensor 56 formed separately from the measuring element 56 is assigned to the measuring element 58. Here, the sensor 58 is a distance sensor 58, by means of which movements of the free end of the second leg 62 of the measuring element 56 relative to the sensor 58 can be detected in a spatially resolved manner (discretely or continuously). The sensor 58 can, for example, comprise a pressure-sensitive foil or be formed by it.

The sensor 58 can in particular be fastened to the inner side 68 of the first section 42 which faces the second section 44. For example, the sensor 58 can thus be glued to the inner side 68 or welded to the first section. Other types of fastening are readily conceivable. Due to the protected arrangement of the sensor 58, it is well-protected against mechanical damage, such as can occur for example during the installation of the sealing device 18.

Figure 3:
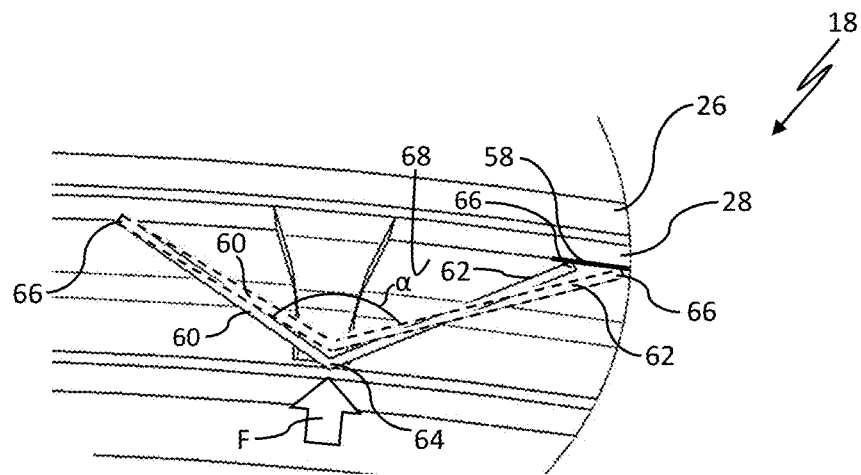
FIG. 3 shows a first embodiment of a sealing device according to FIG. 1 with a measuring element arranged between two sections of the pretensioning ring, which responds to a deformation, induced by radial force, of the pretensioning ring and which interacts with a distance sensor.

If a radial force F acts on the second section of the pretensioning ring 28, by means of which the second section is deflected from its rest position in a spring-elastic manner in the radial direction, this in the case of the exemplary embodiment shown in FIG. 3 will result in a compression of the measuring element 56 that correlates with this deflection. As a result, the free end 66 of the second leg 62 of the measuring element 56 is displaced in the activation direction while being supported on the sensor 58, as shown in FIG. 3 by a dashed representation of the measuring element 56.

Figure 4:
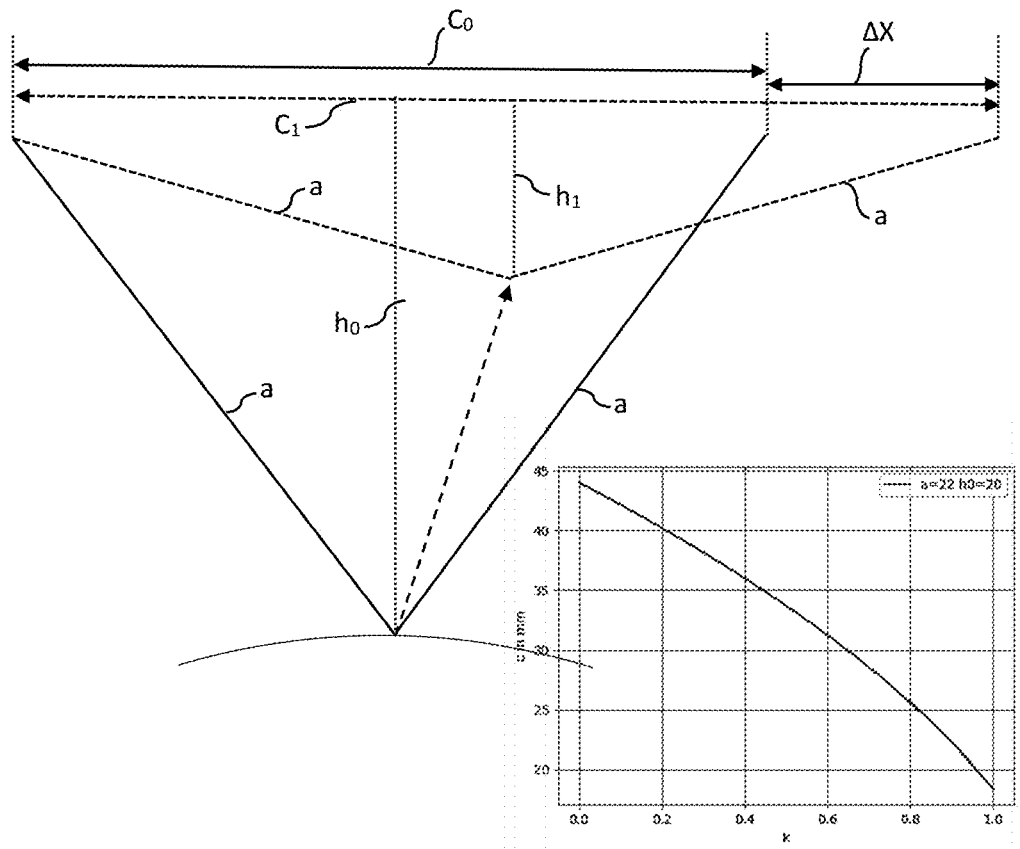
FIG. 4 shows a schematic functional diagram of the measuring element according to FIG. 3.

According to the schematic function diagram shown in FIG. 4, the respectively traveled distance Δx of the free end of the measuring element 56 as the difference of the base length $C_1$ covered by the measuring element 56 when the measuring element 56 is compressed and the base length $C_0$ in the rest state correlates with the deflection of the second section 44 of the pretensioning ring 28, i.e., with the reduction of its height $h_0$ in the rest state, which reduction is associated with the compression of the measuring element 56.

In the present case, the following applies:

$$c = \sqrt{4a^2 - 4h^2} \text{ with } h1 = k*h_0 \text{ with } 0 \leq k \leq 1$$

$$c(k) = \sqrt{4a^2 - 4kh_0^2}$$

where a is the respective length of the two legs 60, 62 of the measuring element 56, $h_0$ is the height of the measuring element 56 in the rest state and $h_1$ is the height of the measuring element in the activated state.

As a result, a respective output signal of the sensor 58 assigned to the measuring element can be unambiguously assigned to a defined deflection of the second section 44 of the pretensioning ring. On the basis of the measurement signals of the sensor 58, a condition monitoring of the sealing device 18, more specifically of the sealing ring 26, and also of operating states of the sealing arrangement 10 can thus be carried out. This is preferably done by means of the evaluation unit 52 (FIG. 1).

Figure 5:
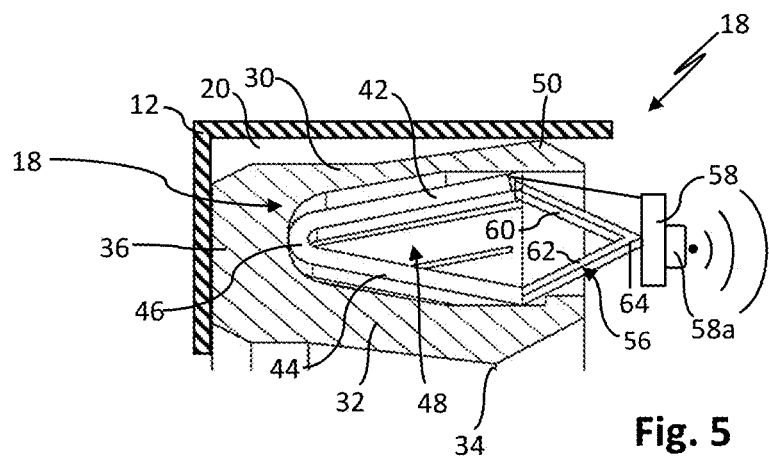
FIG. 5 shows a further embodiment of a sealing device according to FIG. 1 with a measuring element arranged between the two sections of the pretensioning ring, which responds to a deformation of the pretensioning ring and converts this into an axial movement detectable by a sensor.

According to a further embodiment, the measuring element 56 designed as an angled leaf spring element can be arranged between the two sections 42, 44 of the pretensioning ring 28 in such a way that a compression of the measuring element 56 caused by a radial force F results in a force directed in the axial direction or in a displacement of the one free end 66 of the measuring element 56, which can be detected by the sensor 58 and quantified. In this case, the two free ends of the measuring element 56 can be arranged so as to be clamped alone between the two sections of the pretensioning ring 28 or at least one leg 60, 62 of the measuring element 56 is fastened to one of the two sections of the pretensioning ring 28. According to the exemplary embodiment shown in FIG. 5, the corner region 64 of the mechanically deformable measuring element 56 can alternatively also be assigned to the sensor 58. In this case, the sensor 58 can be a contactless distance sensor, for example an ultrasonic sensor or an optical sensor 58, or, according to FIG. 5 can be a pressure-sensitive sensor which is in contact at all times with the measuring element 56. Each of the sensors 58 shown in the drawings can have a transmitter 58a for the wire-free transmission of measurement signals to the evaluation unit (FIG. 1).

Figure 6:
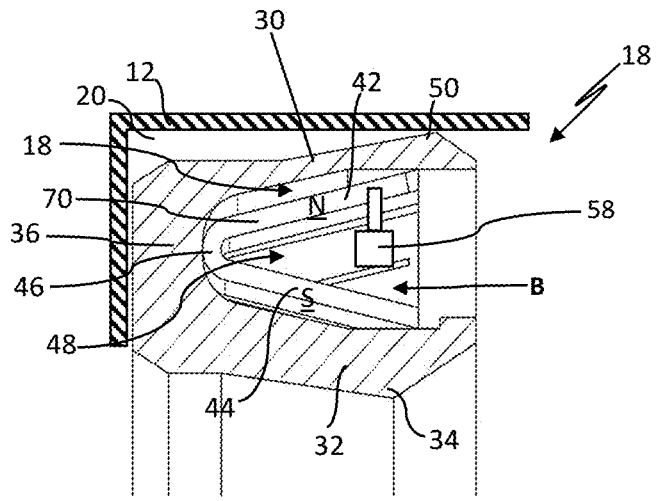
FIG. 6 shows a further embodiment of a sealing device according to FIG. 1, in which the pretensioning ring comprises a permanent magnet, the field change of which can be detected by a measuring element in the form of a Hall sensor and arranged between two sections of the pretensioning ring.

According to the exemplary embodiment shown in FIG. 6, the condition monitoring of the sealing ring 26 can also be carried out by means of a measuring element 56 in the form of a Hall sensor 58. Here, the two sections 42, 44 of the pretensioning ring 28 can together form a permanent magnet 70. One of the two sections 42, 44 of the pretensioning ring 28 forms the north pole N and the respective other section 42, 44 forms the corresponding south pole S of the permanent magnet 70, in such a way that a magnetic field B is formed between the two sections 40, 42. In this case, the measuring element 56 is designed as a Hall sensor, by means of which changes in this magnetic field can be detected. The measuring element 56 is arranged in the intermediate space 48 and can be fastened, for example, to the first section 42 of the pretensioning ring 28.

According to an exemplary embodiment not shown in more detail in the drawing, the two sections 42, 44 of the pretensioning ring 28 can also each have permanent magnets 70 which are arranged complementarily to each other, by means of which the magnetic field is generated in the intermediate space 48 of the two sections of the pretensioning ring 28. The permanent magnets 70 can, for example, be glued, welded or fastened in another suitable manner to the sections 42, 44.

Figure 7:
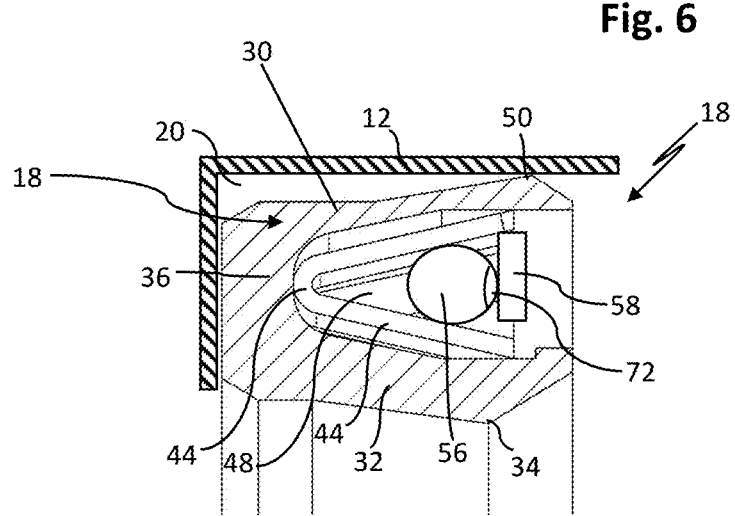
FIG. 7 shows a further embodiment of a sealing device according to FIG. 1, in which an elastomeric measuring element is arranged between two sections of the pretensioning ring and interacts with a pressure-sensitive sensor.

The measuring element 56 can, according to the embodiment shown in FIG. 7, comprise an elastomeric material which can be compressed, preferably in a volume-constant manner, and which extends from the first to the second section 42, 44 of the pretensioning ring 28. The measuring element 56 can be fastened, in particular glued, to one or both sections of the pretensioning ring 28. A sensor 58, preferably operating without contact, is also assigned to this measuring element 56. This can, analogously to the exemplary embodiment shown in FIG. 5, be a distance sensor or also a pressure-sensitive sensor. The measuring element 56 can have a measuring mark 72 for the sensor 59, which consists of a different material than the rest of the measuring element 56. As a result, the adjustment of the relevant sensor 58 can be simplified, if necessary, and incorrect measurements in operational use can be counteracted. This applies in particular to a contactless sensor 58.

Figure 8:
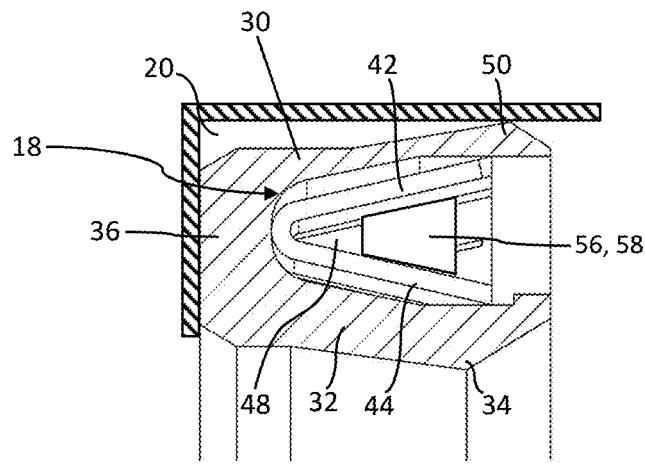
FIG. 8 shows a sealing device in which the measuring element arranged in the intermediate space of the pretensioning ring is designed in the form of a piezo element.

According to the embodiment shown in FIG. 8, the measuring element 56 can also be formed by a piezo element in the intermediate space 48 of the two sections of the pretensioning ring 28. The piezo element is pressure-sensitive and generates measurement signals as a function of a force component acting on the piezo element due to the radial-force-induced deflection of the second section 44 of the pretensioning ring.

Figure 9:
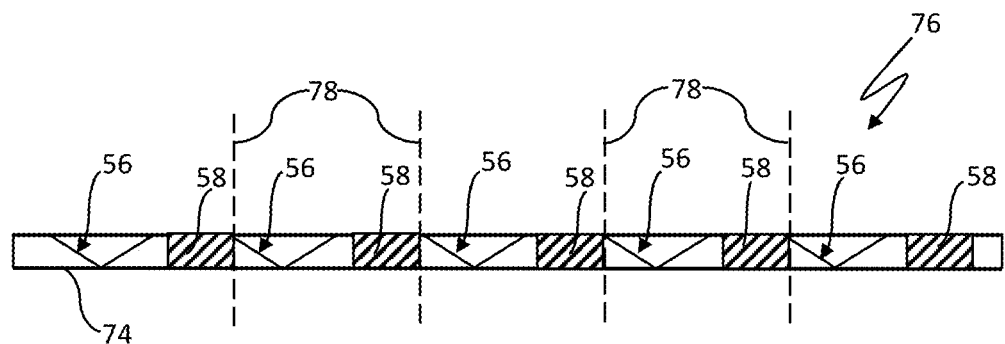
FIG. 9 shows a support element with the sensor system attached thereto for a sealing device according to FIGS. 1-3, in a side view.

According to FIG. 9, the measuring elements 56 explained above and the sensors 58 acting in each case together with the measuring elements 56 can be arranged together on a support element 74 which is designed separately from the pretensioning ring 28. The support element 74, the measuring elements 56 and the sensors 58 thus form an easy-to-handle mounting unit 76. The support element 74 can be designed, for example, in the form of an, in particular open, sleeve. The sleeve can be an extruded sleeve. In this type of design, the measuring elements 56 are inserted into the sleeve. Alternatively, the support element 74 can also be produced together with the measuring elements 56 by means of a 3D printing method. In both cases, the sensors 58 are inserted into the support element 74 or fastened to the support element 74. As a result, a particularly simple mounting of the sealing device can be achieved. In addition, the assembly unit 76 can be cut to length in a simple manner in the region of prespecified separating areas to a dimension required for the respective pretensioning ring.

The measurement signals of the measuring elements 56 or sensors 58 explained above can be transmitted to the evaluation unit 52 by wire or wirelessly. Information about the functional state of the sealing ring 26, of the sealing device 18 or of the entire sealing arrangement 10 can be derived from these measurement signals. The sensors 54 can also be provided with an independent energy supply or with an energy harvesting unit, which is not shown in more detail in the drawing.

What is claimed is:

1. A sealing device with a sensor system for condition monitoring, comprising:
    a sealing ring with a first sealing section for sealing contact at a sealing surface of a machine part;

a pretensioning ring for pretensioning the sealing section against the sealing surface, having a first section and a second section, which together delimit an intermediate space, wherein one of the two sections can be deflected in a spring-elastic manner from a first position relative to the respective other of the two sections in a direction radial or axial to the center axis of the sealing device;

wherein the sensor system comprises at least one measuring element which is arranged in the intermediate space of the pretensioning ring and which responds indirectly or directly to a deflection movement of the one section of the pretensioning ring;

wherein the measuring element is arranged in the intermediate space in such a way that at least sectionally an axial movement or a deformation, directed in the circumferential direction of the pretensioning ring, of the measuring element which can be detected by a sensor is caused by a deflection of one of the two sections in the radial/axial direction relative to the respective other of the two sections;

wherein the measuring element is a spring element which extends from the first to the second section and which interacts with the sensor.

2. The sealing device according to claim 1, wherein the measuring element for the sensor at a predetermined position has a measuring mark made of a different material than the rest of the measuring element.

3. The sealing device according to claim 1, wherein the sensor is a continuous or discrete distance sensor.

4. The sealing device according to claim 1, wherein the sensor is a resistive or a capacitive sensor.

5. The sealing device according to claim 1, wherein the sensor is fastened to an inner side of one of the two sections.

6. The sealing device according to claim 1, wherein the sensor system comprises a plurality of measuring elements and/or sensors, which are arranged spaced apart from one another in the circumferential direction of the pretensioning ring.

7. The sealing device according to claim 6, wherein the plurality of the measuring elements and/or the sensors are arranged together on a support element, which is arranged held between the two sections of the pretensioning ring.

8. The sealing device according to claim 7, wherein the support element is designed in the form of a sleeve or in that the support element together with the measuring elements are designed as a 3D printed part.

9. The sealing device according to claim 1, wherein the pretensioning ring is designed in one piece.

10. The sealing device according to claim 1, wherein the two sections of the pretensioning ring extend away from a back section of the pretensioning ring.

11. The sealing device according to claim 1, wherein the pretensioning ring has a V-shaped or U-shaped cross-section.

12. The sealing device according to claim 1, wherein the pretensioning ring consists of a plastic, a metal, or of a composite material.

13. A sealing arrangement, comprising:
a first machine part and a second machine part, which are arranged at a distance from one another to form a sealing gap and are movable relative to one another along or about a movement axis; and
the sealing device according to claim 1, the sealing ring of which with its sealing section in a sealing manner abuts one of the two machine parts.

* * * * *